United States Patent Office 3,574,750
Patented Apr. 13, 1971

3,574,750
PROCESS FOR THE PRODUCTION OF
CYCLOHEXANONE OXIME
Eizo Yasui, Takeo Kawaguchi, and Takashi Matsubara, Nagoya-shi, Japan, assignors to Toa Gosei Chemical Industry Co. Ltd., Tokyo, Japan
No Drawing. Filed Feb. 27, 1967, Ser. No. 619,027
Claims priority, application Japan, Feb. 26, 1966, 41/11,322
Int. Cl. C07c 131/04
U.S. Cl. 260—566           5 Claims

ABSTRACT OF THE DISCLOSURE

A process for producing cyclohexanone oxime by the oxidation of cyclohexanone in the presence of ammonia and hydrogen peroxide using as a catalyst tungstic acid, isopolytungstic acid, heteropolytungstic acid, or a salt thereof. The oxidation is conducted in the presence of a sulfate, preferably at normal pressure and at a temperature of from 5–50° C. using water as the medium to promote the reaction. The yield of cyclohexanone oxime is about 95%.

BACKGROUND OF THE INVENTION

(1) Field of the invention

The present invention relates to a process for the production of cyclohexanone oxime by the ammoxidation of cyclohexanone and more particularly to an improved process for the production of cyclohexanone oxime by the oxidation of cyclohexanone with hydrogen peroxide in the presence of ammonia using as a catalyst tungstic acid or a derivative thereof.

(2) Description of the prior art

A process for the production of cyclohexanone oxime by the ammoxidation of cyclohexanone with hydrogen peroxide in the presence of ammonia using as a catalyst sodium tungstate is known. See Chemical Abstracts, vol. 55, 1473a. However, there is a fault in the known process in that the conversion ratio of cyclohexanone and the yield of cyclohexanone oxime are at most 75% and 65% respectively and no better results can be obtained.

Therefore, an object of this invention is to provide a process for obtaining cyclohexanone oxime by the ammoxidation of cyclohexanone with a higher yield than those obtained by the conventional process.

Another object of this invention is to provide a high conversion ratio of cyclohexanone into cyclohexanone oxime in a comparatively short period of time without reducing the selectivity of the reaction.

The conversion ratio of cyclohexanone to cyclohexanone oxime and the yield for cyclohexanone oxime by the process of this invention are higher than those by the conventional process wherein a tungstate is simply used as the catalyst and they are also higher than those obtained by the process disclosed in the prior application of the same applicants (U.S. patent application 524,493, British patent application 4,849/66, German patent application T 30,410 IVb/12.0, French patent application 49,193/66, or Italian patent application 32,174/66) in which cyclohexanone oxime is produced by the ammoxidation of cyclohexanone with hydrogen peroxide in the presence of ammonia using heteropolytungstic acid as the catalyst.

SUMMARY OF THE INVENTION

According to the process of this invention, cyclohexanone is generally caused to react with ammonia and hydrogen peroxide in a liquid phase in the presence of a sulfate using as the catalyst tungstic acid or a derivative thereof. In particular, the process of the instant invention can be most profitably practiced by reacting a mixture containing cyclohexanone, water, ammonia and the catalyst together with free ammonia at a temperature of 5–50° C. in the presence of a sulfate, with the addition of 0.5–2.5 mols, based on one mol of cyclohexanone in said mixture, of hydrogen peroxide.

Thus, the feature of the process of this invention is in the use of a sulfate in the ammoxidation of cyclohexanone using as the catalyst tungstic acid or a derivative thereof. Although the action and mechanism of the sulfate contributing to the process of this invention are not clear, it becomes possible by the addition of the sulfate to obtain about 95% in the conversion ratio of cyclohexanone and about 87% in the yield for cyclohexanone oxime, while in the known processes of ammoxidation of cyclohexanone the conversion ratio and yield are at most about 73% and about 65% respectively. Furthermore, when the process of this invention is conducted by using heteropolytungstic acid as the catalyst, the conversion ratio of cyclohexanone can be increased to about 96% and the yield for cyclohexanone oxime to about 96.5%.

In the process of this invention, ammonium sulfate is most preferably employed as the sulfate, but other soluble salts such as potassium sulfate, sodium sulfate, acid potassium sulfate, acid sodium sulfate and the like, may be also employed. Further, in the process of this invention, an acid capable of forming a soluble sulfate when added to the reaction liquid, such as sulfuric acid, may be employed instead of using such a sulfate.

As mentioned above, the ammoxidation in the process of this invention is accelerated by the presence of the sulfate dissolved in the reaction liquid. In the case of using a weakly soluble sulfate, a part of the sulfate incorporated in the reaction system is present in the undissolved state. However, it is not necessary to remove from the reaction system the undissolved sulfate, since the undissolved sulfate will be dissolved in the reaction liquid as the reaction progresses. The amount of the sulfate to be added in the reaction system as 0.01–5.0 parts by weight, and preferably 0.05–2.5 parts by weight, per 1 part by weight of the catalyst, i.e., tungstic acid or a derivative thereof. Further it is preferable that in the case of employing an ammonium salt, such as ammonium sulfate and acid ammonium sulfate, as the sulfate, the amount is 0.5–3 parts by weight per one part of the catalyst, and in the case of employing salts other than ammonium salts as the sulfate, the amount is 0.1–1 part by weight. At that, the addition of an extremely large amount of the sulfate is undesirable, since it accelerates the insolubilization of the catalyst and the decomposition of hydrogen peroxide.

In the process of this invention, tungstic acid or a derivative thereof is used in an amount of 1–50% by weight, preferably 10–35% by weight of the amount of cyclohexanone. As the derivatives of tungstic acid to be used as the catalyst in this invention, there are isopolytungstic acid, such as paratungstic acid, methatungstic acid and the like; heteropolytungstic acid; inorganic water soluble alkaline salts of the acids, such as ammonium salts, potassium salts, sodium salts, lithium salts and the like; and organic amine salts such as pyridine salts, cyclohexylamine salts, and the like.

As described above, paratungstic acid and methatungstic acid may be used as the isopolytungstic acid which is one of the derivatives of tungstic acid. Paratungstic acid is shown by the formula $H_6(W_{12}O_{46}H_{10}) \cdot (n)H_2O$, while methatungstic acid is shown by the formula $$H_6(W_{12}O_{40}H_2) \cdot (n)H_2$$

Further, although the atomic number of tungsten of methatungstic acid is the same as that of paratungstic acid, the condensation degree of methatungstic acid is higher than that of paratungstic acid.

As other derivatives of tungstic acid, there are heteropolytungstic acids having tungsten as the poly-element and phosphorus, silicon, boron, selenium, or iodine as the hetero-element, or heteropolytungstic acids wherein a part of the tungsten has been replaced with vanadium or molybdenum. For example, there are phosphotungstic acid, silicontungstic acid, borotungstic acid, selentungstic acid, phosphotungstovanadic acid, phosphotungstomolybdenic acid, and the inorganic salts, e.g., ammonium salts, sodium salts, potassium salts and lithium salts thereof, and organic amine salts such as pyridine salts and cyclohexylamine salts thereof. Among the heteropolytungstic acids and the salts thereof, those in which the atomic ratio of the heteroelement to the poly-element is 1:12, 2:18 and 1:6 are suitable as the catalyst for the process of this invention. In particular, in the case of employing the heteropolytungstic acids such as phosphotungstic acid, borotungstic acid, or the salts thereof having the atomic ratio of 1:12 or 2:18 as the catalyst, the conversion ratio of cyclohexanone and the yield for cyclohexanone oxime are remarkably improved.

To illustrate more specifically the complex compounds useful as the catalyst of this invention, several of them are represented by the following chemical formulas:

(a)
$$H_3(PW_{12}O_{40}) \cdot 30H_2O$$

(b)
$$H_4(SiW_{12}O_{40}) \cdot 7H_2O$$

(c)
$$H_5(BW_{12}O_{40}) \cdot 30H_2O$$

(d)
$$Na_3(PW_{12}O_{40}) \cdot 30H_2O$$

(e)
$$H_3(PW_{10}V_2O_{39}) \cdot (n)H_2O$$

(f)
$$H_4(SeW_{12}O_{40}) \cdot (n)H_2O$$

DESCRIPTION OF PREFERRED EMBODIMENTS

Now, the process of the present invention will be explained below in detail.

The process of this invention may be carried out in an iron, stainless steel, aluminum-lined or glass-lined reactor by a batch system in which cyclohexanone, a solvent, the catalyst, and ammonia (as aqueous ammonia) are charged in the reactor, hydrogen peroxide and ammonia are continuously introduced into the system with stirring in the presence of the sulfate. The process can be either of a batch type, where the reaction is completed by stirring the reaction mixture for a definite time, or of a one step type or multiple step type continuous system.

The detailed reaction conditions are as follows: That is, in the practice of this reaction it is desirable to use a solvent and as the solvent, water is most desirable but, if necessary, an organic solvent capable of dissolving ammonia, other than ketones and aldehydes, may be used alone or together with water. As the organic solvents to be used in this invention, there are such organic solvents soluble in water as methanol, ethanol, n-propanol, isopropanol, sec-butanol, tert-butanol, etc., or mixtures thereof. In the reaction of this invention, there is no particular limitation as to the amount of the solvent and a small amount may be present at the beginning of the reaction since 2 mols of water per one mol of the cyclohexanone oxime formed is produced in the reaction, and it acts as a reaction medium to advance the reaction smoothly.

The reaction is conducted in the presence of the sulfate as mentioned above, and, if desired, a condensation inhibitor of cyclohexanone such as hydroquinone or various phenol derivatives; and yield-improving agent such as various metal salts, sulfur, sulfides, a sulfur-containing organic compound, various borates, phosphates and the like may be added to the reaction system. In particular, the metal sulfate salt is not only effective as a yield-improving agent for cyclohexanone oxime, but also acts as a promoter by which, even if the proportion of the catalyst in the reaction system in this invention is reduced to some extent, the reduction of the yield of cyclohexanone oxime caused by the reduction of catalyst can be prevented.

As the sulfate metal salts, there are salts of Cu, Ag, Zn, Cd, Hg, Ti, Zr, V, Cr, Mo, U, Th, Mn, Fe, Co, Ni, Pd, Pt and the like, and the salts must be soluble or partially soluble in the reaction liquid. For example, there are soluble or partially soluble inorganic salts, organic acid salts, bases, and oxyacid salts of the metals. Further, it is effective to add the salts of Ag, Cu, Mn, Pd and Pt to the reaction system in an amount of 0.002–0.04% by weight (as metal) of the amount of the catalyst; Ni, Fe, Mo, Hg, and Co in an amount of 0.01–0.5% by weight, and Zn, Cd, Ti, Zr, U, and Th in an amount of 2–50% by weight.

However, it is not preferable to use an excessive amount of the metal salt since the decomposition of hydrogen peroxide is promoted thereby.

Further, for the sulfide and sulfur-containing organic compounds, as yield-improving agents in this invention, there may be used ammonium sulfide, ammonium polysulfide, sodium sulfide, potassium polysulfide, disulfides such as ethyl disulfide, thioethers such as isopropyl thioether and diazo thioether, thiazoles, mercaptans, phenothiazine and derivatives thereof, and thiophene and derivatives thereof. It is effective to use these compounds, in general, in an amount of 0.00001–0.1% by weight of the amount of cyclohexanone to be used. Also, as the water soluble borates and phosphates having the similar action as the above mentioned sulfur compounds there are alkali metal salts and ammonium salts of boric acid, di-boric acid, borous acid, phosphoric acid, pyrophosphoric acid, methaphosphoric acid, tripolyphosphoric acid, acid phosphoric acid and the like, and it is effective to add these salts in an amount of 0.01–20% by weight of the amount of cyclohexanone.

The reaction of this invention may be conducted in such a manner that the sulfate, cyclohexanone and catalyst are dissolved in a solvent containing the above mentioned various additives. An excessive amount of ammonia gas is blown in or concentrated aqueous ammonia is added into the resulting solution, and then an aqueous hydrogen peroxide solution is added dropwise into the reaction mixture while supplying ammonia. Also, the reaction may be conducted in such a manner that the sulfate and the catalyst are dissolved in a solvent, an excessive amount of ammonia gas is blown in or concentrated aqueous ammonia is added into the resulting solution, and then an aqueous hydrogen peroxide and cyclohexanone are added dropwise to the system while supplying ammonia. In addition, it is of course desirable to stir the system forcibly.

As the reaction progresses, the colorless reaction liquid changes color to faint yellow-green. This is caused by the oxidation of tungstic acid or the anion of polytungstic acid. After the reaction is finished, the reaction liquid becomes colorless again. When water is employed as the solvent, white cyclohexanone oxime begins to separate as the reaction proceeds, the precipitates are agglomerated into particles or masses, and then as the reaction proceeds further, the fine particles of cyclohexanone oxime are dispersed in the reaction liquid, whereby the reaction is finished. In the case where the reaction does not proceed sufficiently, fine oil drops are floated in the reaction liquid after the end of the reaction. Further, in any such case where the amount of the catalyst is insufficient, the reaction temperature is too low and the amount of existing ammonia is insufficient, cyclohexanone is caused to react with hydrogen peroxide to form the white acicular crystal of cyclohexanone peroxide, which reduces remarkably the yield of cyclohexanone oxime. The theoretical amount of hydrogen peroxide is one mol per one mol of cyclohexanone, but it is preferable that the amount be slightly larger than the equivalent, that is, it is preferable that the amount of hydrogen peroxide be 1.5 mols per 1 mol of cyclohexanone and the concentration of hydrogen peroxide solution to be added into the system be 10–60% by weight, preferably 20–40% by weight. The reaction temperature is 5–50° C. preferably 10–30° C., since if the reaction temperature is lower than 5° C., the reaction rate is lowered, and if it is higher than 40° C., the selectivity is reduced. The reaction period of time is, in a batch system, usually 30–360 minutes for adding the hydrogen peroxide solution and 5–60 minutes for stirring time required to finish the reaction. In a continuous system, 60–600 minutes for the whole reaction period is sufficient. Ammonia to be added into the reaction system may be gaseous ammonia or aqueous ammonia, but in any case it is necessary that free ammonia be always present in the reaction system during reaction. The amount of ammonia throughout the reaction is stoichiometrically one mole to one mol of cyclohexanone, but from the viewpoint of reaction rate, it is desirable to use an excessive amount of ammonia and usually more than 1.5 mols of ammonia per one mol of cyclohexanone used. If hydrogen peroxide is added into the reaction mixture in which an excessive amount of ammonia is not present, side reactions such as the formation of cyclohexanone peroxide occur remarkably. Hence it is necessary that an excessive amount of ammonia be present in the reaction system at the beginning of reaction.

In the case of carrying out the process of this invention continuously by using a plurality of reactors, it is preferable from the viewpoint of the conversion ratio of cyclohexanone and the yield of cyclohexanone oxime that hydrogen peroxide be separately supplied to each reactor, wherein the amount of hydrogen peroxide being supplied to the preceding reactor is larger than that of the subsequent reactor. In this way the ratio of cyclohexanone to hydrogen peroxide is larger in the preceding reactor. Further, it is desirable from the viewpoint of the yield of cycloexanone oxime and the effective utilization of catalyst that, after separating the greater part of cyclohexanone oxime from the reaction product liquid, the remaining aqueous solution containing the catalyst, ammonia and hydrogen peroxide be used again as the solvent without decomposing the hydrogen peroxide.

In order to recover the thus formed cyclohexanone oxime in the process of this invention, after the end of the oxidation reaction, an extracting agent for organic components, such as benzene, cyclohexane, chloroform or carbon tetrachloride is added in the reaction liquid to form an organic phase, an aqueous phase, and a solid phase. In this way the thus formed cyclohexanone oxime and unreacted cyclohexanone are mostly transferred into the organic phase. On the other hand, since the aqueous phase still contains ammonia, some amounts of cyclohexanone, cyclohexanone oxime and the still active catalyst, it is returned to the reactor directly or after removing part of the water. The solid phase consists of decomposition products of the catalyst and is recovered for reuse as an effective catalyst.

The present invention will now be explained by the following examples.

In addition, in the specification the conversion ratio of cyclohexanone and the yield for cyclohexanone oxime are shown in mol percent, the proportions of components are shown by percent by weight, and the term "part(s)" means part(s) by weight. Further, in the following examples the analyses of cyclohexanone and cyclohexanone oxime are all conducted by means of a gas chromatography.

The conversion ratio of cyclohexanone is $$\frac{\text{converted cyclohexanone (mol)}}{\text{charged cyclohexanone (mol)}} \times 100, \text{ and}$$

The yield for cyclohexanone oxime is $$\frac{\text{formed cyclohexanone oxime (mol)}}{\text{converted cyclohexanone (mol)}} \times 100$$

EXAMPLE 1

Into a reactor equipped with a stirrer and a cooling jacket, 2000 g. of 28% aqueous ammonia, 1000 g. of water, 200 g. of phosphotungstic acid $$(H_3PW_{12}O_{40} \cdot 30H_2O)$$

(containing 169 g. of $WO_3$) and 200 g. of ammonium sulfate were charged. Thereafter, 600 g. of cyclohexanone was added into the solution, gaseous ammonia was blown into the resulting solution at normal pressure at a rate of 500 cc./min., and while maintaining the system at 18° C., 960 g. of a 30% hydrogen peroxide solution was added at a rate of 320 g./hr. over a three hour period. In the instant example, the supplied amount of hydrogen peroxide was 1.38 mol per one mol of supplied cyclohexanone. After the end of the hydrogen peroxide addition, the reaction is conducted at 18° C. The reaction products consisted of white granular solids mainly consisting of cyclohexanone oxime. Then, 3000 g. of benzene was added to the reaction product to form three separate phases, namely a benzene phase containing the cyclohexanone oxime and unreacted cyclohexanone, an aqueous phase containing ammonia and the catalyst, and a solid phase of white precipitates mainly consisting of the insolublized catalyst component.

By gas chromatographic analysis of the benzene phase and the aqueous phase, it was confirmed that the conversion ratio of the cyclohexanone was 96.1% and the yield for the cyclohexanone oxime to thus consumed cyclohexanone was 96.7%. Thereafter, 2100 g. of benzene was was added to the thus separated aqueous phase in three steps (each 700 g.) to extract cyclohexanone and cyclohexanone oxime and the raffinate was distilled at a normal pressure in a Claisen flask equipped with a cooler to cut 1960 g. of water and ammonia. When the distillation residue was allowed to cool to a normal temperature, 175 g. of a white solid was precipitated. The system was filtered by suction using a Buchner's funnel to separate the white solid components mainly consisting of the insolubilized catalyst component from the aqueous phase. A quantitative analysis of the white solid components in a wet state showed that the solid contained 48.5% of tungsten as $WO_3$.

Thereafter, into the thus obtained aqueous phase, 9.8 g. of 98% sulfuric acid was added gradually to adjust the pH of it to 1.5, whereby 120 g. white solid was precipitated. The precipitate contained 67.2% of tungsten as $WO_3$.

The total yields of recovered catalyst as $WO_3$ obtained by the above mentioned two recovery procedures were 98%. In a flask equipped with a stirrer, 290 g. (162 g. of $WO_3$) of the thus recovered catalyst was mixed with 250 g. of water, 4 g. of o-phosphoric acid and 60 g. of 98% sulfuric acid and the system was stirred at 70° C. to convert the recovered catalyst component into phosphotungstic acid. Thereafter, 2100 g. of 28% aqueous ammonia and 570 g. of cyclohexanone were added into the reaction liquid, gaseous ammonia was then blown into it at a rate of 500 cc./min. at normal pressure, and while maintaining the reaction temperature at 18° C., 920 g. of 30% hydrogen peroxide solution was supplied to the system at a rate of 307 g./hr. over a three hour period. The proportion of the thus supplied hydrogen peroxide was 1.4 mols per one mol of cyclohexanone.

After the end of the introduction of hydrogen peroxide, the system was stirred further for 30 minutes at 18° C. and the thus obtained reaction product was subjected to the extraction procedure as above. The analysis of the reaction products thus recovered showed that the conversion ratio of cyclohexanone was 95.3% and the yield for cyclohexanone oxime was 95.3%.

EXAMPLES 2–9 AND COMPARATIVE EXAMPLES 1–3

The same procedure as in Example 1 was repeated using the catalysts shown in Table 1 instead of 200 g. of phosphotungstic acid and 200 g. of ammonium sulfate. The results are also shown in Table 1.

In addition, as the comparative examples, the same procedure was repeated using only phosphotungstic acid, tungstic acid of a sulfate as the catalyst and the results are also shown in Table 1.

TABLE 1

| Catalyst and quality | Cyclohexanone conversion ratio, percent | Cyclohexanone oxime yield, percent |
|---|---|---|
| Example Number: | | |
| 2 — Sodium phosphotungstate ($2Na_2O \cdot P_2O_5 \cdot 12WO_3 \cdot 18H_2O$) (250 grams) plus ammonium sulfate (200 grams). | 96.1 | 92.5 |
| 3 — Ammonium phosphotungstate ($(NH_4)_3PO_4 \cdot 12WO_3 \cdot 3H_2O$) (200 grams) plus acid sulfate, $KHSO_4$ (120 grams). | potassium 94.5 | 89.3 |
| 4 — Phosphotungstic acid ($H_3[PW_{12}O_{40}] \cdot 30H_2O$) (200 grams) plus sodium sulfate (100 grams). | 95.4 | 86.4 |
| 5 — Tungstic acid ($H_2WO_4 \cdot 2H_2O$) (250 grams) plus ammonium sulfate (300 grams). | 96.6 | 89.3 |
| 6 — Sodium tungstate ($Na_2WO_4 \cdot 2H_2O$) (250 grams) plus ammonium sulfate (300 grams). | 94.9 | 87.2 |
| 7 — Ammonium p-tungstate ($5(NH_4)_2O \cdot 12WO_3 \cdot 5H_2O$) (200 grams) plus ammonium sulfate (200 grams). | 95.2 | 88.9 |
| 8 — Silicotungstic acid ($H_4SiW_{12}O_{40} \cdot 7H_2O$) (200 grams) plus ammonium sulfate (200 grams). | 95.1 | 87.6 |
| 9 — Borotungstic acid ($H_5BW_{12}O_{40} \cdot 30H_2O$) (250 grams) plus ammonium sulfate (200 grams). | 96.1 | 89.9 |
| Comparative Example; Number: | | |
| 1 — Phosphotungstic acid ($H_3PW_{12}O_{40} \cdot 30H_2O$) (200 grams). | 94.5 | 81.1 |
| 2 — Sodium tungstate ($Na_2WO_4 \cdot 2H_2O$) (250 grams). | 72.5 | 65.4 |
| 3 — Ammonium sulfate (200 grams). | 52.0 | 0 |

While the invention has been described in connection with preferred embodiments, it will be obvious to those skilled in the art that various changes and modifications may be made therein without departing from the scope of the invention, and it is intended, therefore, to cover in the appended claims all such changes and modifications as fall within the true spirit and scope of the invention.

What is claimed is:

1. A process for the production of cyclohexanone oxime by the ammoxidation of cyclohexanone with ammonia and hydrogen peroxide in the presence of from 1 to 50% by weight based on the amount of cyclohexanone of a catalyst selected from the group consisting of tungstic acid, heteropolytungstic acids, isopolytungstic acids, and inorganic water soluble alkaline salts and soluble amine salts thereof selected from the group consisting of pyridine and cyclohexylamine, which comprises conducting said ammoxidation at a temperature of from 5 to 50° C. in the presence of a soluble sulfate selected from the group consisting of potassium sulfate, sodium sulfate, acid potassium sulfate, acid sodium sulfate and ammonium sulfate in an amount of from 0.01 to 5.0 parts by weight per one part by weight of said catalyst.

2. The process as claimed in claim 1 wherein said sulfate is ammonium sulfate.

3. The process as claimed in claim 2 wherein the proportion of said ammonium sulfate is 0.5–3 parts by weight per one part by weight of said catalyst.

4. The process as claimed in claim 1 wherein the proportion of said sulfate is 0.1–1 part by weight per one part by weight of said catalyst.

5. The process as claimed in claim 1 wherein said ammoxidation is conducted in an aqeuous phase.

References Cited
UNITED STATES PATENTS
2,718,528   9/1955   Pieper _____ 260—566A
2,706,204   4/1955   Kahr _____ 260—566A

OTHER REFERENCES
Lebedev et al., Chem. Abst., vol. 55, col. 1473(a), 1961.

Lebedev, J. Gen. Chem., U.S.S.R., vol. 30, pp. 1629–1633 (English translation).

LEON ZITVER, Primary Examiner

G. A. SCHWARTZ, Assistant Examiner